(12) United States Patent
Macfaden

(10) Patent No.: US 12,033,066 B2
(45) Date of Patent: Jul. 9, 2024

(54) OPTICAL PROCESSING SYSTEMS

(71) Applicant: Optalysys Limited, Castleford (GB)

(72) Inventor: Alexander Joseph Macfaden, Castleford (GB)

(73) Assignee: Optalysys Limited, Castleford (GB)

( * ) Notice: Subject to any disclaimer, the term of this patent is extended or adjusted under 35 U.S.C. 154(b) by 0 days.

(21) Appl. No.: 17/050,356

(22) PCT Filed: Apr. 26, 2019

(86) PCT No.: PCT/GB2019/051170
§ 371 (c)(1),
(2) Date: Oct. 23, 2020

(87) PCT Pub. No.: WO2019/207317
PCT Pub. Date: Oct. 31, 2019

(65) Prior Publication Data
US 2021/0056358 A1 Feb. 25, 2021

(30) Foreign Application Priority Data
Apr. 27, 2018 (GB) .................................... 1806950

(51) Int. Cl.
*G06N 3/067* (2006.01)
*G06F 18/21* (2023.01)
(Continued)

(52) U.S. Cl.
CPC ........... *G06N 3/067* (2013.01); *G06F 18/217* (2023.01); *G06N 3/04* (2013.01); *G06V 10/454* (2022.01); *G06V 10/764* (2022.01); *G06V 10/82* (2022.01)

(58) Field of Classification Search
CPC ................................................... G06F 17/153
See application file for complete search history.

(56) References Cited

U.S. PATENT DOCUMENTS 5,909,500 A * 6/1999 Moore ................... G06V 40/30
382/204
6,529,614 B1 3/2003 Chao et al.
(Continued)

FOREIGN PATENT DOCUMENTS

EP 0499469 A2 8/1992
EP 0621524 A1 10/1994
(Continued)

OTHER PUBLICATIONS

Lizana A, Márquez A, Lobato L, Rodange Y, Moreno I, Iemmi C, Campos J. The minimum Euclidean distance principle applied to improve the modulation diffraction efficiency in digitally controlled spatial light modulators. Optics express. May 10, 2010;18(10): 10581-93. (Year: 2010).*

(Continued)

*Primary Examiner* — Clifford Hilaire
(74) *Attorney, Agent, or Firm* — Muncy, Geissler, Olds & Lowe, P.C.

(57) ABSTRACT

An optical processing system comprises at least one spatial light modulator, SLM, configured to simultaneously display a first input data pattern (a) and at least one data focusing pattern which is a Fourier domain representation (B) of a second input data pattern (b), the optical processing system further comprising a detector for detecting light that has been successively optically processed by said input data patterns and focusing data patterns, thereby producing an optical convolution of the first and second input data patterns, the optical convolution for use in a neural network.

23 Claims, 11 Drawing Sheets

(51) Int. Cl.
*G06N 3/04* (2023.01)
*G06V 10/44* (2022.01)
*G06V 10/764* (2022.01)
*G06V 10/82* (2022.01)

(56) References Cited

U.S. PATENT DOCUMENTS

| | | | | |
|---|---|---|---|---|
| 7,603,038 | B1 * | 10/2009 | Berman | H04B 10/1121 |
| | | | | 398/118 |
| 8,886,283 | B1 * | 11/2014 | Chen | A61B 5/4064 |
| | | | | 382/128 |
| 2013/0222582 | A1 | 8/2013 | Mohan | H04N 9/3102 |
| | | | | 348/143 |
| 2017/0234985 | A1 * | 8/2017 | Kadambi | G01S 17/894 |
| | | | | 702/152 |
| 2018/0074304 | A1 * | 3/2018 | Hernandez-Cubero | |
| | | | | G02B 21/06 |
| 2018/0341248 | A1 * | 11/2018 | Mehr | G05B 13/048 |
| 2019/0019100 | A1 * | 1/2019 | Roques-Carmes | G06N 10/00 |

FOREIGN PATENT DOCUMENTS

| | | | | |
|---|---|---|---|---|
| EP | 1546838 B1 | 5/2019 | | |
| WO | WO-9931563 A1 * | 6/1999 | | G06E 3/00 |
| WO | WO-2004029746 A1 * | 4/2004 | | G06E 3/00 |
| WO | WO-2008110779 A1 * | 9/2008 | | G06E 3/003 |
| WO | 2014087126 A8 | 6/2014 | | |
| WO | WO-2014087126 A1 * | 6/2014 | | G02F 3/00 |
| WO | WO-2016110667 A1 * | 7/2016 | | G01B 11/27 |
| WO | WO-2017141997 A1 * | 8/2017 | | G06T 7/00 |

OTHER PUBLICATIONS

Liu JS, Collings N, Crossland WA, Chu DP, Waddie A, Taghizadeh MR. Simulation and experiment on generation of an arbitrary array of intense spots by a tiled hologram. Journal of Optics. Jul. 30, 2010;12(8):085402. (Year: 2010).*
Harasthy T, Ovseník L, Turán J. Current summary of the practical using of optical correlators. Acta Electrotechnica et Informatica. Oct. 1, 2012;12(4):30. (Year: 2012).*
Kodate, K., Watanabe, E., Delac, K., & Grgic, M. (2007). Compact Parallel Optical Correlator for Face Recognition, and Its Application (pp. 235-260). IntechOpen. (Year: 2007).*
International Search Report and Written Opinion dated Jul. 16, 2019 in International Application No. PCT/GB2019/051170.
Chen Hauijin G et al.: "ASP Vision: Optically Computing the First Layer of Convolutional Neural Networks Using Angle Sensitive Pixels", 2016 IEEE CVPR, Jun. 27, 2016.
Nguyen Thanh et al.: "Compuational optical tomography using 3-D deep convolutional neural networks", Optical Engineering, Soc. of Photo-Optical Instrumention Engineers, Bellingham, vol. 57, No. 4, Apr. 1, 2018.

* cited by examiner

OPTICAL PROCESSING SYSTEMS

This application is a 371 National Phase of PCT Application No. PCT/GB2019/051170, filed on Apr. 26, 2019; which claims priority to Great Britain Patent Application No. 1806950.0 filed Apr. 27, 2018, and each of which is herein incorporated by reference in its entirety.

TECHNICAL FIELD

The invention generally relates to machine learning convolutional neural networks. In particular, the invention relates to accelerating convolutional neural networks using optical correlation-based processing systems.

BACKGROUND AND PRIOR ART KNOWN TO THE APPLICANT(S)

Convolutional neural networks (CNNs or ConvNets) are well known, having become the pre-eminent machine learning technique in image analysis. They are deep, feed-forward artificial neural networks which achieve state-of-the-art performance for image recognition and classification. The life of a ConvNet is typically split into training and inference. Training a large convolutional network however is very time consuming—it can take several weeks, even when using state of the art a Graphic Processing Unit (GPU)s. Some of the more complicated ConvNets can take longer to run, both in the training and inference stage.

In ConvNets, the convolutional layers represent a very significant—often the majority—part of the computational load. Furthermore, increasing the resolution of the convolutions (increasing either the input size or the kernel size) imposes a significant further computational burden. This drives network configurations away from consisting of large numbers of high-resolution convolutional layers or causes them to modify the convolutional layers to reduce the computational burden.

Accelerating training and inference of ConvNets has been attempted digitally, using various algorithms implemented on, for example, GPU or FPGA architectures. However, further acceleration is highly desirable.

It is to this problem, amongst others, that embodiments of the present invention attempt to offer solutions.

SUMMARY

In a first independent aspect, there is provided an optical processing system comprising at least one spatial light modulator, SLM, configured to simultaneously display a first input data pattern (a) and at least one data focusing pattern which is a Fourier domain representation (B) of a second input data pattern (b), the optical processing system further comprising a detector for detecting light that has been successively optically processed by said input data patterns and focusing data patterns, thereby producing an optical convolution of the first and second input data patterns, the optical convolution for use in a neural network.

The optical processing system comprises a 4f optical correlator, wherein the input data pattern (A) is in the input plane of the correlator and the data focusing pattern is in the Fourier plane. The data focusing pattern may comprise a convolutional kernel or filter. The SLMs have a dynamic modulating effect on impinging light. The SLMs may be parallel layers for example, or they may be in the same plane, as described in PCT/GB2013/051778. In such 4f optical correlators, light from the optical input is incident on said displayed patterns and successively optically processed thereby such that each of the input data patterns and focusing patterns form a successive optical path, before the light is captured at the detector.

The data focusing pattern is chosen to be a Fourier domain representation (B) of a second input data pattern (b). That is, the filter is computed from the second input data pattern to produce the required convolution for the ConvNet. For example, the data focusing pattern may be computed digitally.

The neural network may be a convolutional neural network (ConvNet), wherein the optical convolution is suitable for a convolutional layer of the neural network. Typically, the second input data pattern is referred to as a 'kernel' with which the first input data pattern is convolved.

Significantly, the optical correlator is a more suited platform for evaluating (2D) convolutions than known digital implementations. The optical approach provides improved performance over such methods.

In some embodiments, the first input data pattern (a) comprises a plurality (N) of tiled input so data patterns—or 'feature maps'—each of the plurality of tile input data patterns corresponding to a member of a 'batch' of images being processed, and wherein a plurality of convolutions are produced in parallel for each of the plurality of tile input data patterns. In some embodiments, the second input data pattern comprises a plurality (M) of tiled kernel data patterns, each of the plurality of tiled kernel data patterns corresponding to a distinct member of a set of filter kernels (b), and wherein a plurality of convolutions are produced in parallel for each pair (N×M) formed of said tiled input data patterns and tiled kernel data pattern.

Accordingly, input 2D images and/or 2D kernels may be tiled. By tiling, we mean that the tiles do not overlap each other and are within the span of a detector area. Accordingly, each 'tile' is of a smaller resolution than the detector resolution. This results in different ways of using a given hardware resolution to perform multiple, lower resolution convolutions. Advantageously therefore, by appropriately selecting tiled inputs and kernels, the full resolution of the detector (e.g. camera) can be exploited. Tiling of both the input and kernels in order to fully utilise the convolution resolution produces results across the detector (camera) plane. Advantageously, a plurality of convolutions are achieved in parallel, for each input and kernel data pair (each one may be a 'tile'). The parallel convolutions may be 'batched'. A batch represents a plurality of smaller Fourier transforms.

Note that, in the case of tiling the kernels, they are tiled in the direct representation (b) with appropriate padding. They are then converted into a Fourier-domain filter representation (B). Due to the specifics of filter generation, this conversion is not perfect and can lead to crosstalk between the different operations.

Preferably, the optical processing system further comprises a processor for digitally obtaining the data focusing pattern (B) from the second input data pattern (b). Accordingly, the filter of the 4f optical correlator is computed digitally from the kernel. This is a relatively fast process due to low filter resolution (compared to optical detector resolution). Furthermore, once the net has been trained these patterns can be re-used; they do not need re-computing.

The processor may be configured to obtain the data focusing pattern using a minimum Euclidian distance (MED) method. This method assumes that the appropriate available SLM modulation value to use to represent a given complex value is the value which is nearest by distance measured on the complex plane.

Advantageously, the 4f optical correlator may be employed to speed up the inference process of a ConvNet, the net having been trained on a conventional digital platform with knowledge of the idiosyncrasies of the optical system.

Alternatively, the 4f optical correlator may be incorporated into the net and used directly in the training process. The optical correlator is used during the forward propagation through the net, while conventional digital convolutions are used during backward propagation.

It should be appreciated that the restrictions on the filter image due to properties of the spatial light modulator limit the data focusing patterns (B) which can be displayed, and hence the corresponding convolutional kernels (b) that can be implemented. However, in certain embodiments, it is important that the maximum spatial frequency components of the data focusing pattern (B) are limited, as this determines the effective size of the corresponding kernel (b). Recall that the data focusing pattern (B) and the kernel (b) are linked by a discrete Fourier Transform (DFT). This fact must be considered during the data focusing pattern design. Accordingly, the system controls the maximum spatial frequency content of the filter to limit the effective kernel width; that is, the size of the kernel and the distance beyond which points in the input cannot affect corresponding points in the output. This prevents undesired connectivity between different convolution operations. Key to successful operation is controlling this connectivity.

In some embodiments, the second input data pattern (b) is a signed kernel having positive and negative components.

In some embodiments, the kernel is decomposed into 1) a positive-valued kernel p and 2) a uniform bias kernel bl, such that f*k=f*(p−bl) being reconstructed from the two positive-valued convolutions. This overcomes the fact that the detector (camera) cannot measure negative amplitudes.

In some embodiments, the SLMs are binary SLMs rather than multi-level SLMs. Binary SLMs have high-bandwidth, providing high performance, but require the application to be adapted to the limitations of the devices.

In some embodiments, the system further comprises a lens or lens selection for adjusting magnification and for optically pooling the neural network.

In a further aspect, there is provided a method of producing an optical convolution, using an optical processing system as described above. Such a method may be used to convolve, or to convolve and pool a layer of a neural network. For example, the method may be used for training or inference of a convolutional neural network.

In a further aspect, there is provided the use of a system as described above in deep machine learning for image analysis.

In a second independent aspect, there is provided a method of configuring a neural network using a 4f optical correlator, the method comprising the steps of:
  displaying a first input data pattern (a);
  determining at least one data focusing pattern (B) as a Fourier domain representation (B) of a second input data pattern (b);
  displaying the at least one data focusing pattern (B);
  detecting light that has been successively optically processed by said input data patterns and focusing data patterns, thereby producing an optical convolution of the first and second input data patterns; and
  using the optical convolution as part of a neural network.

In some embodiments, the method further comprises the steps of tiling at least one of first and second input data patterns and producing a plurality of optical convolutions in parallel.

In some embodiments, different system components operate at different speeds. A camera operating slower than an input SLM is exposed across multiple frames in order to produce a result which is the sum of multiple optical convolutions.

It will be appreciated that all of the optional embodiments described with reference to the system aspects, apply to the methods.

DETAILED DESCRIPTION

The present inventors have realised that optical correlators may be utilised in specific ways to evaluate convolutions which are at the core of Convolutional Neural Nets (CNNs), or ConvNets. In other words, optical processing is being applied to deep learning processes, in particular to evaluate convolutions required by a ConvNet. This application is not trivial, however, as optical convolution has specific idiosyncrasies which require consideration. Specifically, the problems are related to limitations of the electro-optic and opto-electrical hardware available, as will be described in detail below.

The Optical Fourier Transform and Optical Correlators

Coherent optical processing systems are known. In coherent processing systems such as optical correlators, a laser or other coherent source is typically employed to be modulated in either phase or amplitude, or a combination of the two by one or more spatial light modulator (SLM) devices. SLMs are devices that have a dynamic modulating effect on impinging light. These typically incorporate liquid crystal devices but may also be micromirror microelectromechanical (MEMS) devices. Optical correlator devices are typically used as optical pattern recognition systems. In a 4f matched filter or Joint Transform Correlator (JTC) system, the SLM devices are addressed with functions that represent either input or reference patterns (which can be images) and/or filter patterns, usually based upon Fourier transform representations of reference functions/patterns that are to be "matched" to the input function.

A camera such as a complementary metal-oxide-semiconductor (CMOS) or charged couple device (CCD) sensor is typically positioned in the output plane of the optical system to capture the resulting optical intensity distribution, which in the case of an optical correlator system may contain localised correlation intensities denoting the similarity and relative alignment of the input and references functions.

Coherent optical information processing exploits the fact that a simple lens renders a Fourier transform and the most common function used in the type of coherent optical systems concerning both the prior art and the invention is the optical Fourier Transform (OFT)—the decomposition of a temporal or, in this case, spatial distribution into its frequency components. This is analogous to the pure form of the two-dimensional Fourier transform denoted by the following equation:

$$G(u, v) = FT[g(x, y)] = \int\int_x\int_x g(x, y)\exp[-i2\pi(ux + vy)]dxdy,$$

where (x,y) represent space/time variables and (u,v) are frequency variables.

Figure 1:
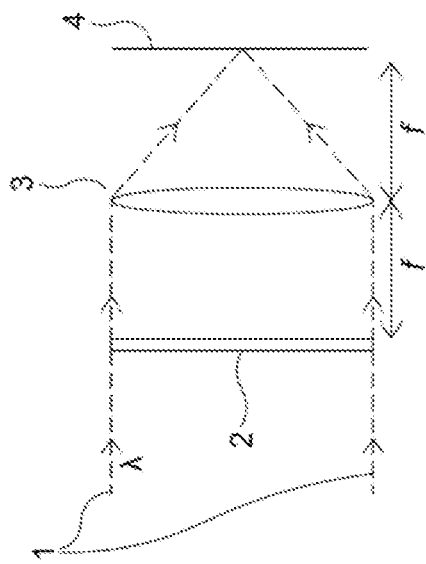
FIG. 1 is an optical path diagram derived from the applicant's own prior art.

The OFT may be achieved by the optical system shown in FIG. 1 where collimated coherent light of wavelength λ (typically laser light) 1 is modulated in phase or amplitude by a Spatial Light Modulator 2 (SLM, typically a liquid crystal or electro-mechanical MEMs array). The modulated beam is then passed through a positive converging lens 3, of focal length f and focused in the back focal plane of the lens, where a detector such as a CMOS array 4 is positioned to capture the intensity of the resulting Fourier transform.

The front focal plane (which may be referred to for clarity as the downstream focal plane) contains precisely the Fourier transform—both amplitude and phase—of a complex field found at the back focal plane (which may be referred to for clarity as the upstream focal plane). This is consistent with the fact that for a perfectly flat beam of infinite spatial extent, a single spot is obtained (the 'DC' term in Fourier theory).

In optical processing systems, the OFT may be employed as a direct replacement for the electronic/software-based Fast Fourier Transform (FFT) family of algorithms, offering significant advantages in terms of process time and resolution. This process may be used as the basis of a variety of functions.

Correlation between two or more functions may be achieved in an optical system in two main ways. The first way is a matched filter process, denoted by the following equation:

$$r(x,y)\!\star\! g(x,y)=FT[R(u,v)^*\!\times\! G(u,v)]$$

Where upper case functions represent the Fourier transform of their lower case equivalents; "*" indicates the complex conjugate of the adjacent function and "⋆" denotes the correlation function.

The second way to achieve correlation is to use a Joint Transform Correlation process, such as the 1/f JTC described in EP1546838 (WO2004/029746).

In each case the correlation is formed as the inverse Fourier transform of the product of two functions, which have themselves been Fourier transformed. In the case of a matched filter, one optically by a lens; and one electronically during the filter design process. In the case of the JTC, both optically.

Figure 2:
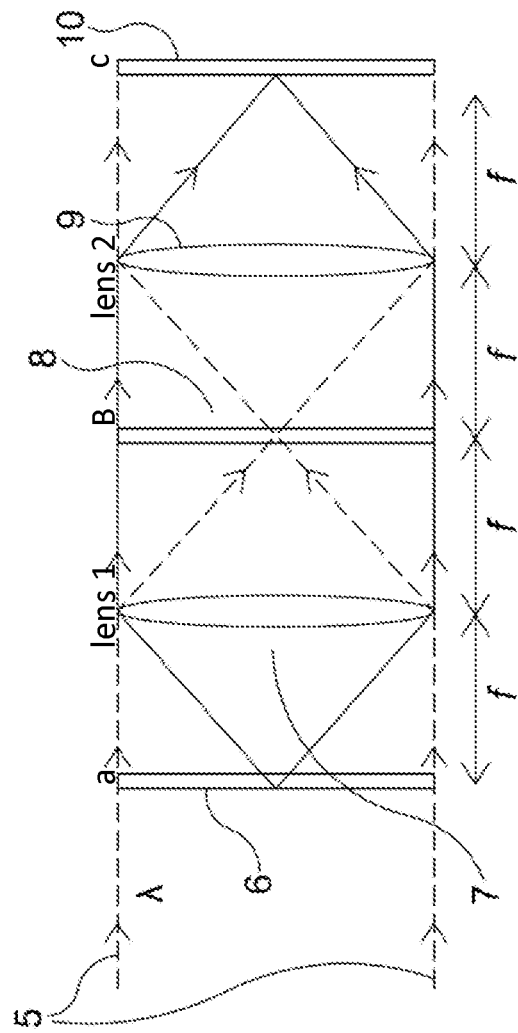
FIG. 2 is another optical path diagram showing a known "4f" optical system.

FIG. 2 shows a "4f" optical system that can be used to realise a matched filter or other convolution-based system. FIG. 2 shows a collimated coherent light source 5 of wavelength λ which is modulated by SLM pixel array 6 ("input data" a), and then transmitted through lens 7 ("lens 1") and focused on the second SLM pixel array 8, forming the OFT ($\mathcal{F}$) of the function displayed on the first SLM, at the pixels of the second SLM 8 (filter B). The resulting optical point-wise matrix multiplication is then inverse Fourier transformed by lens ("lens 2") and the result is captured at the detector array 10 (which may be or may include a camera, c).

For a matched filter process, the pattern displayed by the pixels of the first SLM 6 will be the "input scene, a" g(x,y) and the pattern displayed on the second SLM 8 will represent a version of the Fourier transform of the reference function r(x,y).

As shown in FIG. 2, data is input into the optical correlator system at the planes a and B, using SLMs 6, 8. For example, if a beam of complex amplitude A(x,y) passes through a SLM with a spatially-varying transmission function t(x,y), the resulting beam has an amplitude $$A(x,y)\cdot t(x,y).$$

Input data a are placed at the front of the system. The filter 8 (B) effectively multiplies the optical field by a 2D function B. The camera sensor 10 images the output beam $c^2$. The system performs the mathematical operation $$c=\mathcal{F}^{-1}\{F\{a\}\cdot B\}$$

where c is in turn a complex amplitude function. (The second lens in reality performs a forward, rather than inverse Fourier transform, but the net effect is a coordinate inversion compensated for by the camera sensor orientation.) The camera sensor measures the intensity of this field, $I=|c|^2$.

The convolution theorem uses the Fourier transform to effect the convolution (*) of two functions, $f$ and $g$, by simple multiplication:

$$\mathcal{F}\{f*g\}=\mathcal{F}\{f\}\cdot\mathcal{F}\{g\}.$$

The present inventors have realised that the effect of the optical system is to evaluate a convolution $$a*\mathcal{F}^{-1}\{B\}=a*b.$$

One of the inputs to the correlation, a, is directly input into the optical system. The second input to the correlation, b, is processed digitally. This is performed off-line, producing B using a digital discrete Fourier transform followed by post-processing to map onto the available filter levels (appropriate use of the optical correlator incurs a small overhead in generating filter B from target b).

Accordingly, the present inventors acknowledge that correlation is tightly related to the convolution process, corresponding to reversing coordinates in the function being convolved with. It is noted that in 2D images, a reversal in each coordinate is a rotation of the image. For clarity, these functions are defined in 1D for clarity, though they naturally extend to 2D.

Convolution (*) of two functions $f(x)$ and $g(x)$ is defined, in both discrete and continuous representations, as:

$$f*g(x)=\Sigma_i f(i)g(x-i),$$

$$f*g(x)=\int f(\chi)g(x-\chi)d\chi.$$

Convolution (o) of the same two functions $f(x)$ and $g(x)$ is defined as:

$$f \circ g(x) = \Sigma_i f(i) g(x+i),$$

$$f \circ g(x) = \int f(\chi) g(x+\chi) d\chi.$$

From these definitions, it can be seen that the operations are interchangeable under coordinate reversal of one of the functions. This reversal is performed in the optical correlator by rotating the filter. Accordingly, for symmetric functions, correlations and convolutions are equivalent. Importantly, the present inventors have realised that an optical correlator may be thought of as also an optical convolver.

Correlation is, amongst other things, very useful for pattern matching applications. The process can be perceived as dragging one function over another and taking the dot-product (projection) between them at the set of all displacements. Two functions will have a large dot-product, and produce a 'correlation spot' optically, corresponding to locations where their displaced versions match.

Figure 3:
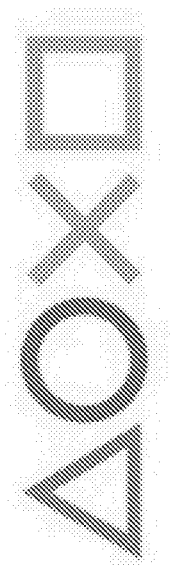
FIGS. 3(a) to 3(c) show an example of optical correlation of two functions.
Figure 3:
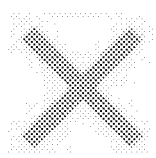
Figure 3:
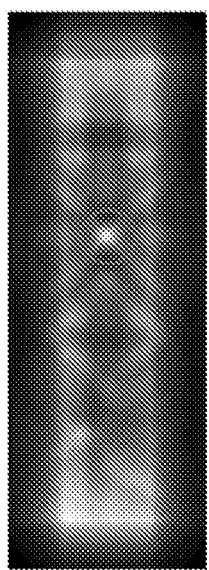

FIGS. 3(a) to 3(c) show an example of correlation of two functions. A test image (a) is correlated with a target (b). A peak in the output (c) shows where there is a match—this is circled in FIG. 3(c).

Information is encoded into the optical beam by using SLMs. SLMs are essentially very small displays (indeed, some of the devices used in optical processors system originate in display projectors). These devices use liquid crystal technology—combined with optical polarisers—to modulate the light beam. In general, the amplitude and relative phase of the light beams can be modulated. Different devices offer different capabilities. In general, devices can be split into two categories: multilevel SLMs and binary SLMs.

Figure 4:
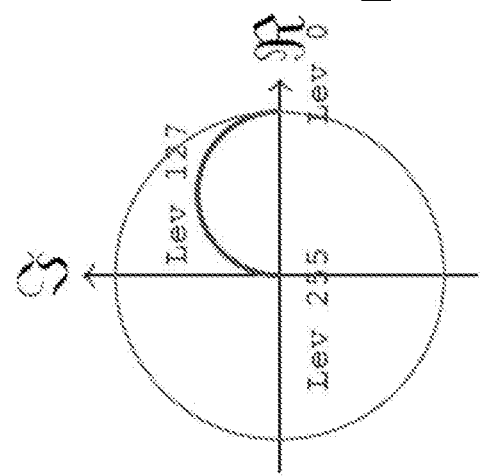
FIG. 4 is an Argand diagram of the complex plane.

In the case of multilevel SLMs, each pixel on the device can be set to one of a number of different levels (normally 8-bit, or 256 levels). Depending on the optical polarisation, the device may modulate the amplitude or phase of the optical field in a different manner. The SLM is not capable of independently modulating the magnitude and phase of the optical field. In general, there is some coupled modulation. This modulation can be expressed by an 'operating curve;' a path on the complex plane describing the accessible modulation. FIG. 4 is an Argand diagram of the complex plane, showing an example of a curve where the 256 modulating levels of the SLM lie. Multilevel SLM devices typically operate at around 100 Hz.

Binary SLMs typically operate much faster than multilevel SLMs, at around 10 KHz. However, binary SLMs only offer 2 different modulation levels, which may be either amplitude-modulating, phase-modulating or both. Despite only offering two levels, the much higher speed means that binary SLMs are the highest bandwidth devices.

It is noted that, if used as a filter SLM, a binary SLM is not restricted to representing a binary convolution kernel as the Fourier transform of a binary function is not necessarily binary. However, a binary filter does restrict the ability to control the spatial frequency content of the filter.

Convolutional Neural Networks (ConvNets)

Figure 5:
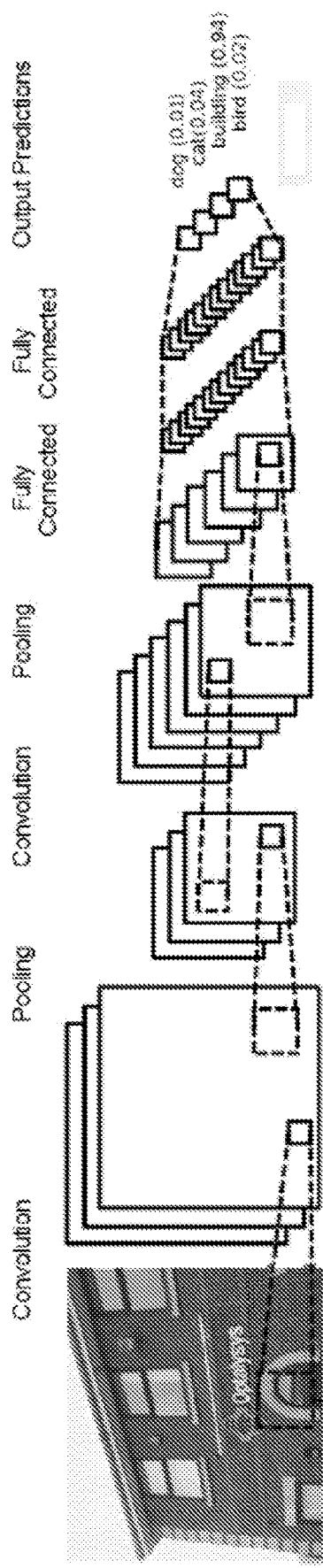
FIG. 5 is a schematic representation of a 2D convolution (ConvNet) based on the prior art; a further example may be obtained from http://deeplearning.net/tutorial/lenet.html.

An example schematic of a 2D ConvNet is summarised in FIG. 5. In particular, an input image 11 is split into tiles and 2D convolutions are performed on these tiles. Different layers of processing then follow. These include 'pooling' layers which down sample resolution; further convolutional layers; application of non-linear application functions; and classic 'fully connected' neural-net layers.

ConvNets typically comprise a number of different layers chained together, including:
  Convolutional layers, where the input(s) are convolved with a given kernel.
  Pooling layers, where the layers are spatially down-sampled.
  Activation layers, where a (non-linear) activation function is applied.
  Fully connected layers, which are a classic fully-connected neural net with fully specified weights between each of the nodes. These are used to generate the final classification-node values.

Whilst it will be appreciated that there are many nuances to ConvNets, summarised here is only a high-level overview of a canonical architecture. These layers can be combined in a myriad of different ways. Configuring neural networks correctly, with good performance and without excessive computational demand, is one of the key challenges of the field.

At each layer (aside from the fully-connected layers) the state of the network being passed forward is a 3D object (or 4D when including the batch dimension), consisting of a set of x,y 'feature maps' due to the application of different convolutional kernels.

Within the layers there are further configuration options. For example, there are many ways the convolutional layer can combine the different feature maps from the preceding layer, and there are a variety of non-linear activation functions.

The life of a ConvNet can be split into training and inference.

After the configuration of the net has been defined, it must be trained. There are a large number of parameters within the net which must be empirically determined, including the convolution kernels and the weights of the fully-connected layers.

Initially, these parameters are randomly set. Training them requires a large pre-classified dataset. This training dataset is fed through the net, and the errors between the correct and reported classification are then fed back through the net (back-propagation). The errors with respect to each point in the net are used with a gradient-descent method to optimise the variables (i.e. weights in the kernel) at that point. Convolutions are performed during the backpropagation. It is unlikely that these should be implemented optically due to the higher precision requirements.

Once training is complete, the net can be deployed for inference, where data is simply presented to the net and propagated through to the final classification layer.

Applying Optical Processing to ConvNets/Implementing Optical Convolutions

An optical 4f correlator may be used to evaluate convolutions, and in particular to accelerate ConvNet inference applications. Advantageously, inference can be made to work at relatively lower precision (compared to training which requires high precision in order for the numerical gradient descent methods to work robustly—particularly during backpropagation).

The optical implementation of the convolution is not a symmetric operation. Referring back to the section 'The optical Fourier transform and optical correlators' above, one of the arguments a was input directly into the optical system, whereas for the second argument b its Fourier-domain representation B was computed and displayed as a 'filter', in the vernacular of the optical correlator. This is in contrast to a pure convolution, where a and b are interchangeable.

Figure 6:
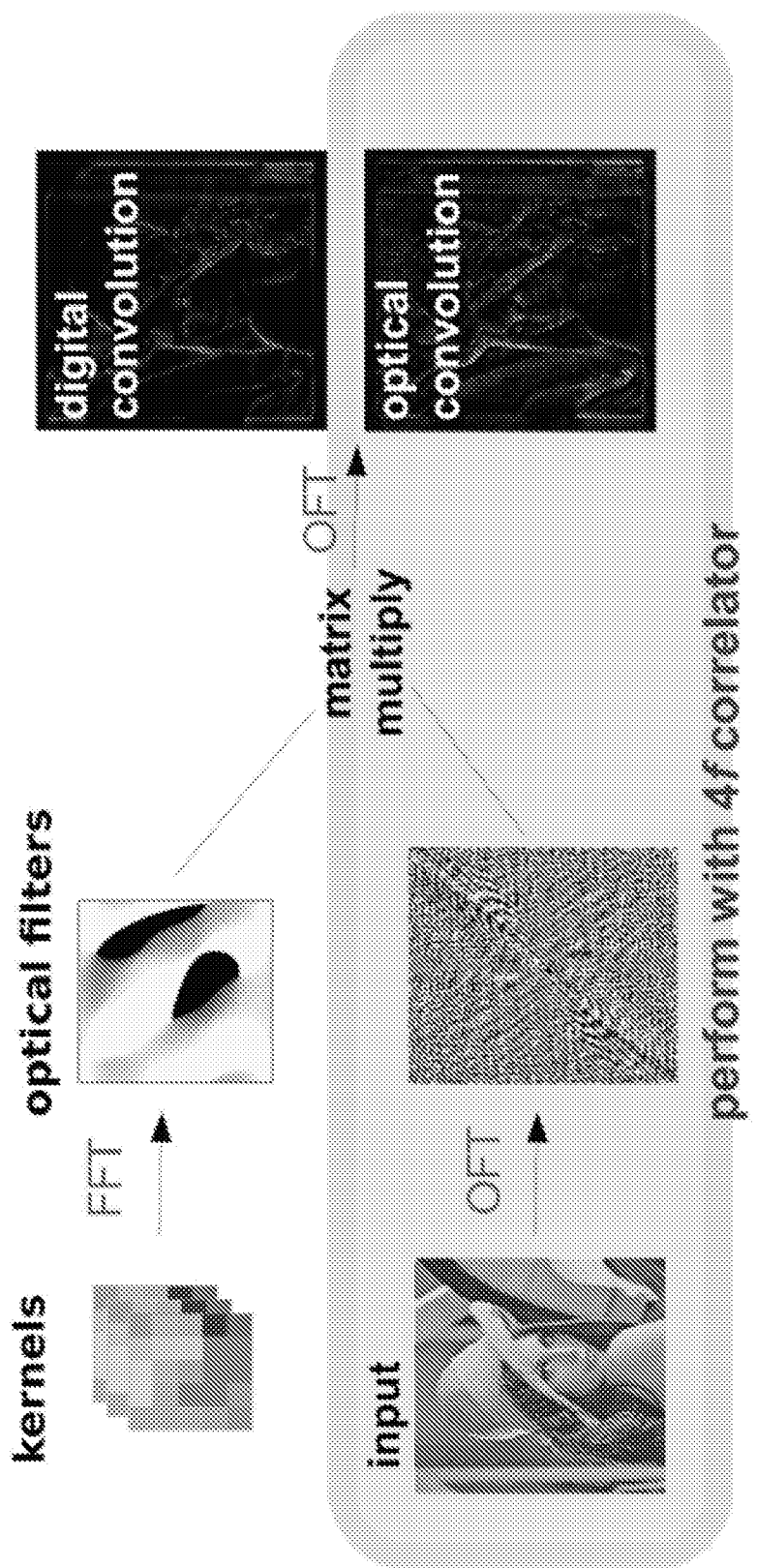
FIG. 6 is an example of Fourier domain convolution.
Figure 7A:
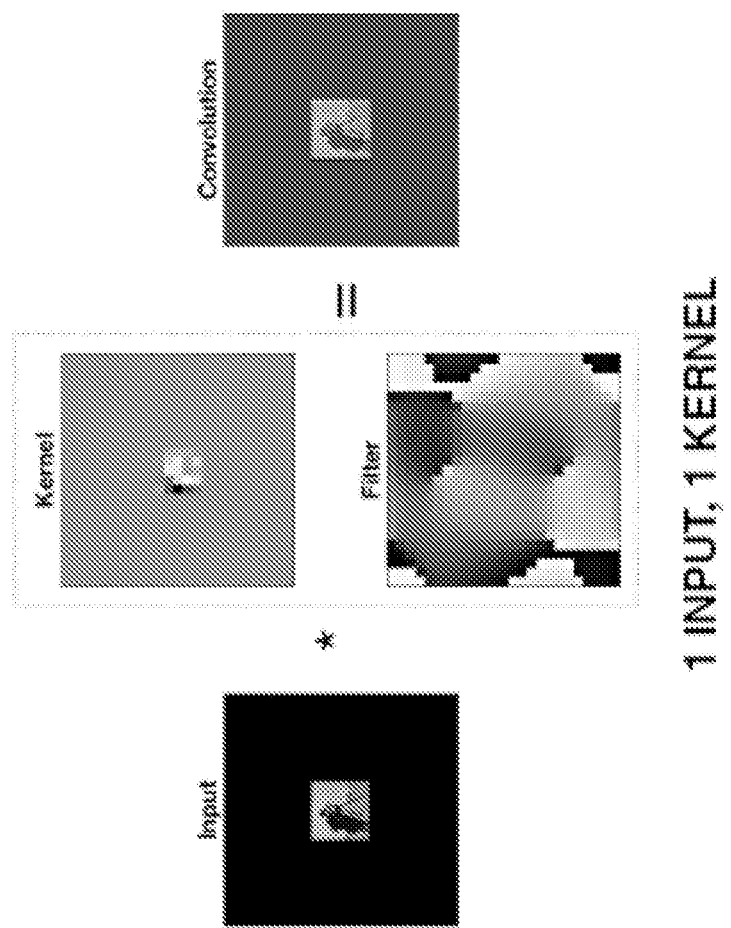
FIGS. 7(a)-7(d) show different ways of using a fixed input hardware to perform multiple lower-resolution convolutions.
Figure 7B:
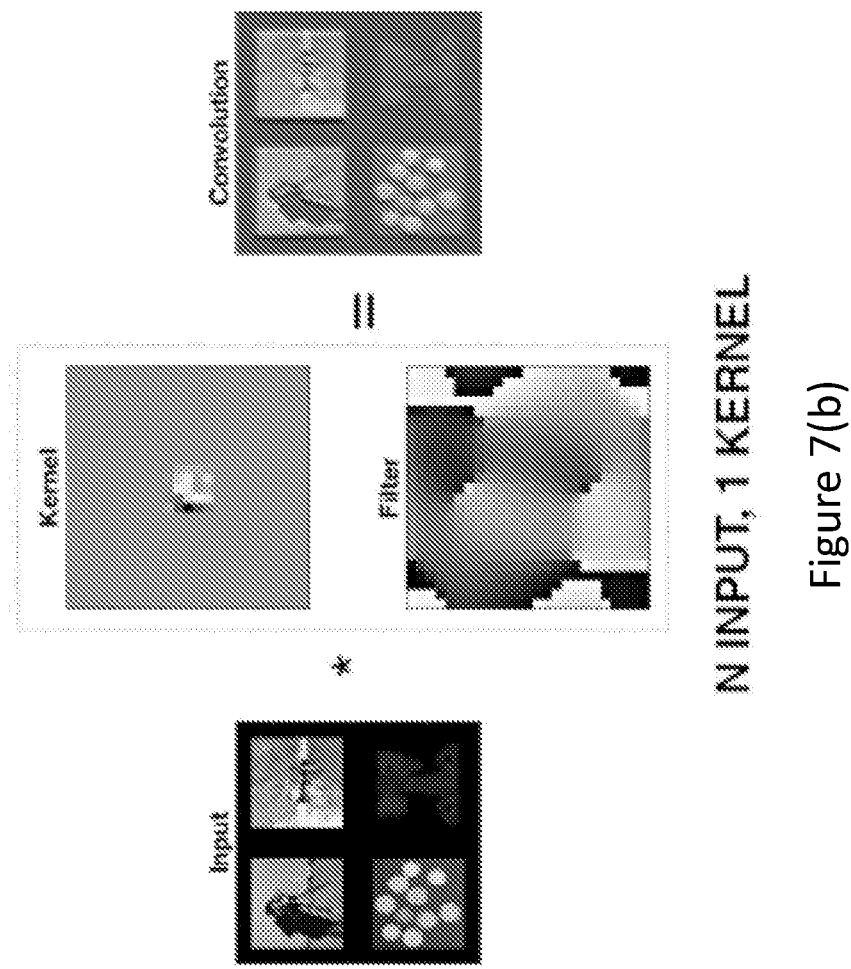
Figure 7C:
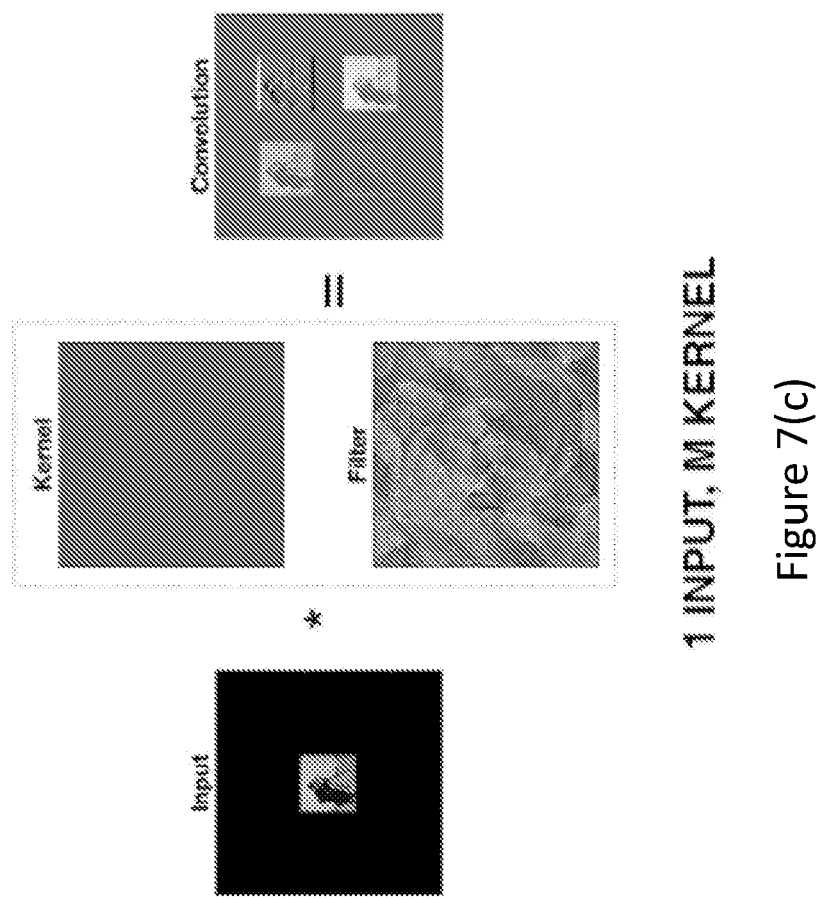
Figure 7D:
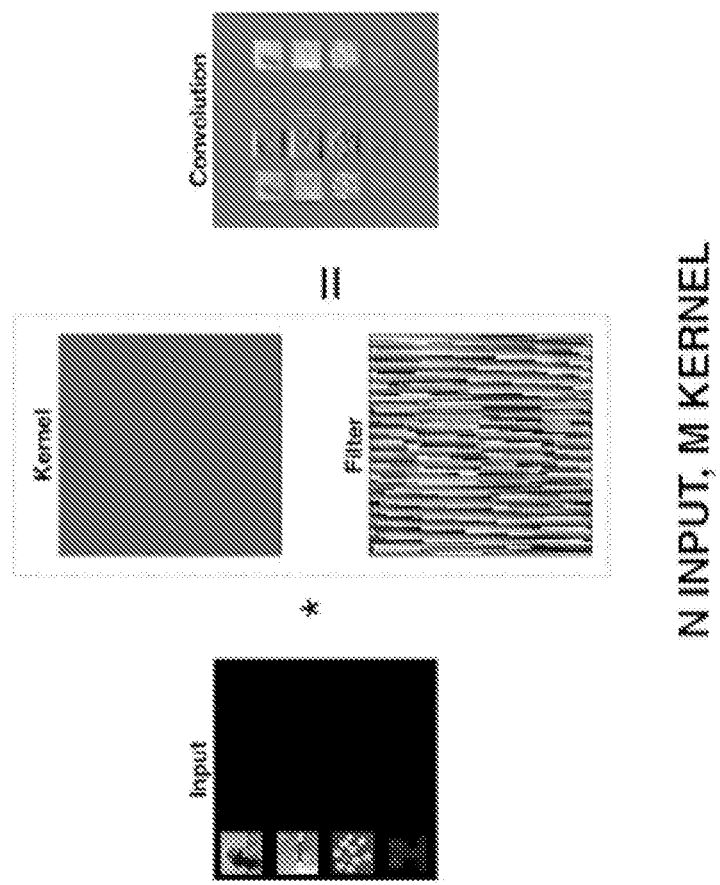

Accordingly, the process of creating the filter and input leads to asymmetric performance. Schematically, this Fourier domain convolution is summarised in FIG. 6. FIG. 6 illustrates the principle by which convolution is evaluated optically, with reference to a 4f correlator. The input is optically Fourier transformed, optically multiplied by a filter, and then optically Fourier transformed back to produce the convolution. The filter is computed digitally from the kernel. (Due to the low filter resolution, this can be a fast process).

This architecture requires digital computation of the filter based on the kernel. This is not a significant overhead. The pre-computed filters can be stored once training is finished removing this overhead during interference. Secondly, the relatively low resolution of the kernel simplifies the filter computation. The technical aspects of kernel calculation will be discussed below.

Taking the hardware into consideration, the optical convolution is an O(1) process. A convolution at the resolution of the SLM and camera is performed in the "cycle time" of the system; that is, the period it takes for the system to update itself. Different aspects of the system (input SLM, filter SLM, and camera) can have different cycle times. The effective throughput of the system is determined by the speed of the fastest component; slower components constrain the actual operations that the system can perform.

These hardware considerations lead to at least four different technical problems with using the optical processor to evaluate convolutions for use in a neural net:

1. The O(1) operation is a fixed-resolution convolution. On the other hand, an application which requires flexibility in convolution resolution should be accommodated.
2. The limited operating range of an SLM means that arbitrary data cannot be input into the system. This has implications for both the input and the filter.
3. By using a camera sensor to measure the result, one measures the intensity rather than the complex amplitude. Not only does this preclude measuring the phase of the output, even if the output is real, one cannot determine positive and negative numbers. (signed results)
4. Hardware limitations mean that different components of the system (input, filter, camera) may operate at different speeds. Specifically, the camera may operate slower than the input and/or filter SLMs. Hence, the output of the system is integrated over a number of different frames.

These problems and their solutions are now addressed in turn.

1. Fixed Resolution Convolutions

As discussed, the convolution performed is at the resolution of the system hardware. While a ConvNet may have a relatively high-resolution input, the pooling stages mean that as the net progresses the resolution of the convolutions decreases. Even the first convolutional layers are unlikely to utilise the resolution of the correlator. This issue may be addressed by optically parallelising the convolutions. By arranging a number of inputs on the input SLM, the convolution with respect to the same kernel in parallel may be found.

Referring back to FIG. 2, a set of inputs are tiled to form the function a. The desired convolution kernel b is converted into an appropriate filter B. The resulting optical convolutions are arranged across the output plane c.

The input must be separated appropriately. When evaluating discrete convolutions, the 'full' convolution will extend a kernel width beyond the input footprint. Thus, the different inputs must be tiled with sufficient separation to allow this data to be extracted without crosstalk between the different results. To obtain only the 'valid' convolution, one can tile more tightly by neglecting the borders of the result. Preferably, when tiling more tightly, the system may be configured to avoid the full convolution regions overlapping with the same-padded regions of neighbouring images.

This may technically be referred to as "same-padding" convolution. In CNN terminology: "valid" convolution refers to the case where no zero-padding is applied (i.e. the kernel must stay entirely within the "valid" region defined by the image dimensions): this results in an output image that is a kernel-width smaller than the input image. For small kernels this is a minor difference, but in most CNN cases, "same-padding" convolution is preferred rather than full or valid.

However, input tiling is not the only form of tiling available to use. The kernels can also be tiled before converting them into optical filters. The corresponding convolutions will then be tiled. Enough space should be allowed between the tiled kernels such that the resulting convolutions do not run into each other. This form of tiling is more challenging to implement as it is more demanding of the optical filter function and can lead to degraded performance as more kernels are tiled together.

FIGS. 7(a) to 7(d) show different ways to use a fixed input hardware convolution to perform multiple lower-resolution convolutions. By appropriately combining inputs and kernels, it is possible to ensure efficient usage of the hardware convolution resolution; the goal is to ensure that the output (camera) resolution is fully utilised.

Evaluating a batch of lower-resolution Fourier transforms is not as effective a use of the system as evaluating a single high-resolution Fourier transform. Parallelisation of this fashion has an effect on the competitiveness of the optical approach relative to a digital approach. Advantageously, the optical approach offers a Fourier transform as an O(1) process, as compared to an O(N log N) process as offered by a digital Fourier transform. The size of the Fourier transform is determined by the resolution of the system. It is when exploiting this full resolution that we can achieve the biggest performance gain.

When we do not make use of the full resolution Fourier transform, we do not make use of the full system performance, although tiling goes some way towards recouping this. While we are still making use of the full resolution of the system, we are not capitalising on the high-resolution of the corresponding Fourier transform. Instead we are using it to implement a 'batch' convolution process. This batch approach is instead equivalent to a number of smaller Fourier transforms.

A fraction of the latent performance is 'lost' when the full resolution of the inherent Fourier transform is not used directly, but instead is used to perform a batch of lower resolution transforms. This following comparison between these two applications is made using simple computational scaling arguments.

The comparative computational scaling is considered to be dominated by the scaling of the Fourier transforms (the element-wise multiplication is 'cheap' by comparison). Thus, one can compare our performance respectively as:

$FFT:O(N \log N)$ $OFT:O(1)$,

There are N pixels in total. Instead of evaluating one size-N transform, a batch of P size-M transforms are now evaluated, where N=M·P. The same O(1) scaling applies for the OFT, but the FFT now has scaling:

Batch=$FFT:O(P \cdot M \log M)$.

A "slowdown factor" S is defined, which describes the factor of the roofline performance we can be achieved, subject to these simple scaling arguments:

$$S = \frac{P \cdot M \log M}{N \log N} = \frac{P \frac{N}{P} \log \frac{N}{P}}{N \log N} = \frac{\log N - \log P}{\log N}$$

$$S = 1 - \frac{\log P}{\log N}$$

The bases of the logarithms in this formula do not matter. This formula is the fraction of the roofline performance advantage of the optical system relative to a computer one expects to realise when performing batched operations.

Figure 8:
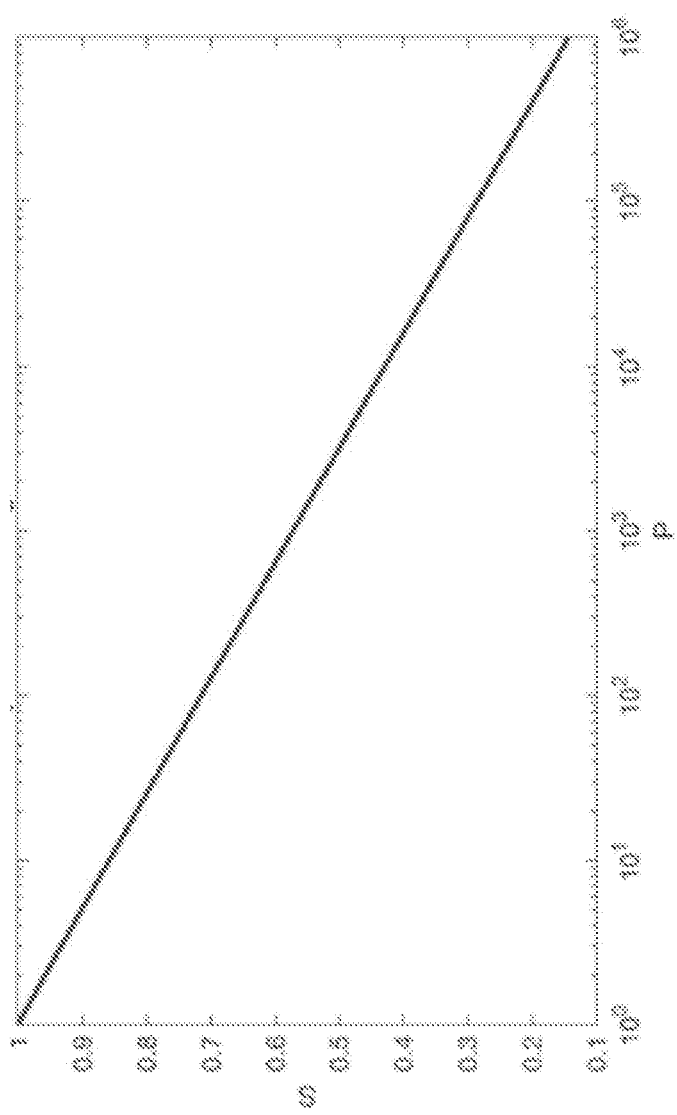
FIG. 8 is a plot of a "slowdown factor" S relative to roofline performance when a 10 MPx input is split into P batches, when compared with a digital Fourier transform.

FIG. 8 is a plot of a "slowdown factor" S relative to roofline performance when a 10MPx (10E6) input is split into P batches, when compared with a digital Fourier transform. It can be seen that the behaviour is relatively favourable—even when the input is split to a million 10-pixel batches, only a factor of 10 in performance is lost.

2. Accommodating SLM Operating Ranges

As discussed, both the input and filter SLM have limited operating range. The implication of this is that an arbitrary convolution cannot be performed. It is not necessarily a straightforward case of simply implementing convolution kernels optically.

This can be illustrated by considering the filter SLM. Consider that we have a target kernel and wish to determine the corresponding filter. Given the known operating range of the SLM, one can find the optimal representation for this filter. However, it will not represent exactly the target kernel, but a different kernel. In CNN applications, we may call this actual kernel the 'hidden kernel.' This process is illustrated in FIG. 9.

Figure 9:
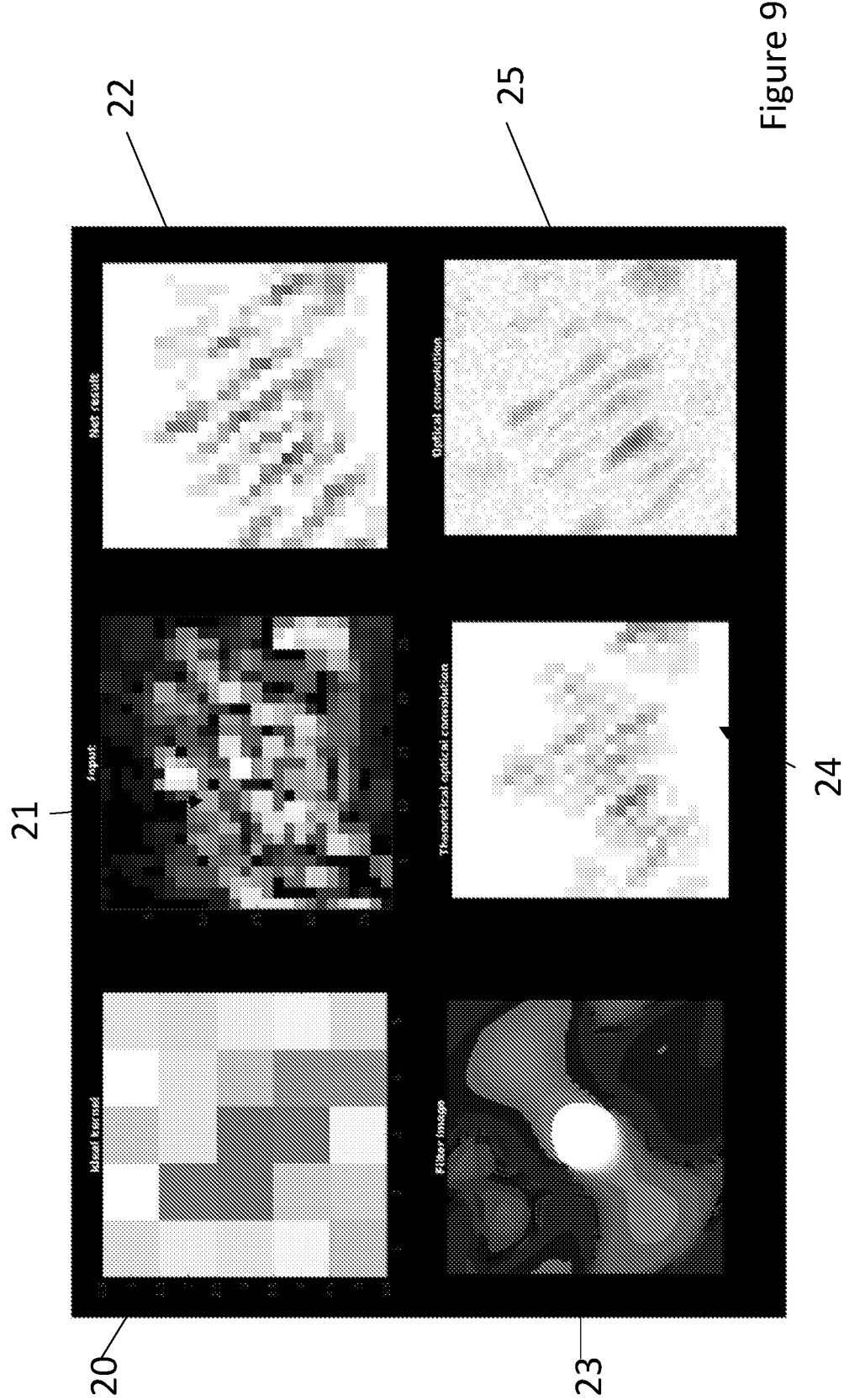
FIG. 9 illustrates an example in which an optical system is used to perform convolutions.

As shown in FIG. 9, a kernel 20 and an input 21 are digitally convolved together within a neural net to produce an optical convolution 22. The optimal filter 23 corresponding to a given kernel is produced, given the SLM operating range. Given this filter and back-calculating for the true 'hidden' kernel, one expects to see that a different convolution, as shown at 24. The optical convolution measured is shown at 25—a good agreement with the theoretical optical convolution 24 may be observed.

This new kernel has the property of still selecting the same features as the original kernel, but it is not identical. However, as shown FIG. 9, the optical system is performing as expected. For the avoidance of doubt: the system does perform optical convolutions with high fidelity; it just cannot perform all convolutions—including the arbitrary example shown in FIG. 9. However, the hidden kernel which is in fact implemented is well-defined and well known. There are a number of different ways of getting from the target kernel to the filter, and hence the corresponding hidden kernel.

The broad workflow addressed is one where the net is trained on a conventional digital computer, and then deployed on the optical platform for accelerated inference applications. The training must be cognisant of the performance of the optics. The fundamental principle being capitalised on is the fact that the minimisation landscape explored when training a ConvNet is not particularly dramatic. There should be an adequate solution in a region accessible to the optical convolutions. There are two fundamental ways the limited SLM range can be addressed, in the form of different ways in which the filter can be derived from the kernel:

1. Firstly, one can use a strategy which uses the optimal optical filter implementation of a given target kernel, as determined by some metric. When training the net, either it can be assumed that the optimal implementation is sufficiently close to the conventional digital convolution, or the properties of this optical convolution can be incorporated into the training of the net.
2. Secondly, one can train the net agnostic to the properties of the optical convolution, and neglect any sophisticated filter design strategies. This could be done by directly parameterising the kernel for example. For example, instead of using the 25 parameters of a 5×5 kernel to specify the kernel directly, they could be used to parameterise the filter via some appropriate set of basis functions. An appropriate set of basis functions is a Fourier basis; the kernel would be Fourier transformed and the result scaled appropriately to map directly onto the drive values of the SLM. This results in a hidden kernel related arbitrarily to the drive convolution kernel values. In order for backpropagation to still train successfully, the connectivity of the net must be the same as that for a conventional convolution (the same elements of the kernel linking together this same pixels in an input and output feature map), and an accurate convolution must be used during backpropagation.

In one implementation, training occurs entirely digitally, using either a conventional convolution operation or a high-fidelity simulation of the correlator. The trained neural net is then deployed on the optics for inference, potentially after an intermediate quantisation or calibration step. In a second implementation, the optical convolution is used directly during training. Bearing in mind optical aberrations, device imperfections etc, the latter is expected to work most effectively.

It is noted that the restrictions on kernel representation have implications during the training step. Back-propagation involves setting the convolution kernels to the errors, and needs to be performed with appropriate fidelity. This is not an issue if the model is trained in a computer and then deployed optically (an important first step in the development). A 630 number of techniques can be used to enable the error-kernels to be implemented optically by improving filter performance, for example: improved SLM characterisation and optimisation; filter spatial- and temporal-dithering and use of multiple SLMs in conjunction to extend the SLM modulation range.

When attempting to implement a given kernel, an appropriate method to use is the minimum Euclidian distance (MED) method common in generating optical filters for correlators. The principle is to find the closest accessible point on the complex plane to a given complex value required by the Fourier transform of the filter.

This method is most successful if the complex values available to the SLM (the 'operating curve') are mixed-mode, in that they modulate both amplitude and phase.

It is important that the filter does not contain spatial frequency components that make the kernel effectively larger than it is supposed to be. In most embodiments, subsequent layers for the same input cannot be computed simultaneously, so filter-bleed crosstalk occurs between different training examples in the image batch, not different layers of the network.

A technique to avoid this is to ensure that the kernel design process does not introduce any higher spatial frequency components. For example, if a higher kernel resolution is required to display on the SLM, padding with zeros and then Fourier transforming, or Fourier transforming and then performing a sinc-interpolation are both valid approaches (other interpolation schemes—while sub-optimal—might offer adequate performance).

3. Bipolar results

The use of the camera to measure optical intensity means that one cannot directly determine the sign of the output function. While some net configurations may tolerate this, it is nonetheless potentially an important issue as, for example, commonly applied nonlinearities (e.g. ReLu) depend on the sign of the measured function. However, the present inventors have developed a method to straightforwardly determine the sign of the resultant convolution by making use of a bias function.

Consider that the aim is to optically evaluate the convolution f*k where f is positive, and k is a bipolar kernel. (Bold font is used here to denote a 2D matrix). This convolution can be manipulated into the difference between two separate convolutions:

$$\underset{>0}{f} * k = \underset{>0}{f} * (\underset{>0}{p} - bI) = \underset{>0}{\underline{f * p}} - \underset{>0}{bf * I}$$

where I is an identity matrix of the same size as the kernel. A bias b was applied to the kernel in order to produce a positive biased kernel p. We then have a second kernel which is simply a matrix of 1s; application of this kernel is the same as boxcar averaging. Both of these two convolutions now have exclusively positive inputs, so have positive outputs. The camera can measure without having lost amplitude information as it is known a priori. The difference between these two functions then yields the convolution desired.

Figure 10:
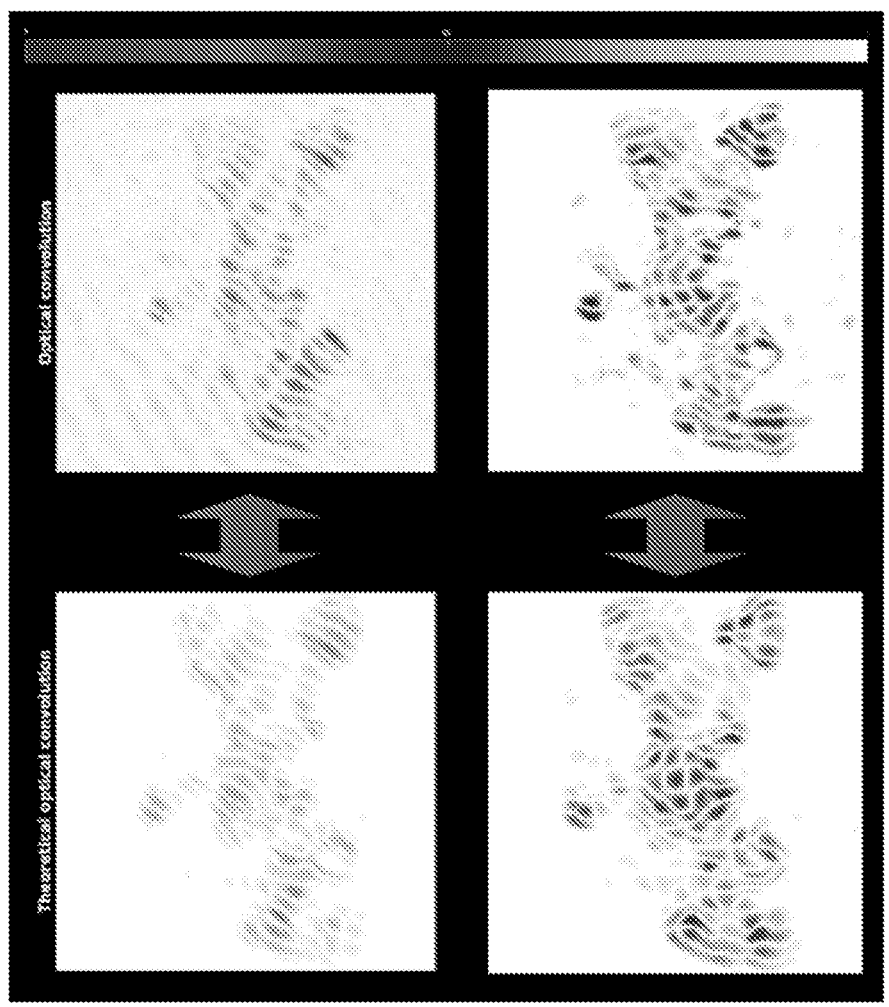
FIG. 10 shows two examples of a digitally computed signed convolution and the corresponding optical convolution obtained according to embodiments of the invention.

FIG. 10 shows two examples of a digitally computed bipolar convolution and the corresponding optical convolution, obtained using the method described. This method is effective at obtaining bipolar convolutions, as shown in FIG. 10. The convolutions presented are not directly imaged off of the camera, but the result of this differencing procedure.

This method has minimal performance overhead. The filter corresponding to the kernel I is trivial, and the overhead of differencing two functions is trivial. These two operations could be conducted in parallel.

Moreover, if the input f is also bipolar, it can be split into positive and negative components, these processed separately, and the result reconstituted by combining the resulting convolutions.

4. Camera slower than SLMs

Due to hardware limitations, it will often be the case that the camera operates slower than the SLMs. Thus, while the system will be able to process data at a rate determined by the throughput of the SLMs, the resulting frames cannot be independently captured. A particular implementation may involve a fast input SLM, a slower filter SLM, and an intermediate-speed camera.

However, the system can still be used usefully. The camera exposure can span multiple input SLM frames. The camera then captures multiple convolutions, which are optically integrated; the frames are added together.

This is conducive to a typical convolution operation found within neural networks, which actively implement this addition. Consider, for example, that a convolutional layer in a Theano neural network operates on 4D-tensors. The operation inputs (A,B) and output (C) are defined as:

$$A = A(\text{batch}, \text{input\_channel}, x, y) \text{ \% Feature maps}$$

$$B = B(\text{output\_channel}, \text{input\_channel}, x, y) \text{ \% Kernels}$$

$$C = C(\text{batch}, \text{output\_channel}, x, y) \text{ \% Outputs} = \Sigma_i \text{ conv2}$$
$$[A(\text{batch}, i, :, :), B(\text{output\_channel}, i, :, :)]$$

It can be seen that while the primitive operation is a 2D convolution, this is immediately incorporated in a summation with other 2D convolutions. This can be directly emulated optically, by exposing the camera throughout multiple input frames (albeit with the caveat that we will be summing the intensity magnitude, rather than the amplitude which represents the true convolution result).

Other Aspects

In some embodiments, pooling schemes are implemented optically. The objective of pooling is to reduce the resolution of a given feature map using some down-sampling scheme. By engineering the optical scaling of the system, a given input resolution can be rendered onto a given (smaller) output resolution. The effect of this is naturally to implement an l2 pooling (sum of intensities).

The highest bandwidth SLMs are binary and may be used to represent the filter. A binary filter B can be made that corresponds to a far more general kernel b. There are some constraints on the kernel due to a binary filter—such as symmetry—but there are a number of ways around this (for example, use of a fixed random phase mask in conjunction with the filter SLM). The restriction that the filter be binary does not correspond a restriction that the kernel is binary. However, it does have significant implications for limiting the spectral content of the filter, and it is challenging to control the kernel width with a binary filter. For this reason, it is preferable to not use the binary SLM as the filter SLM.

Another—more useful—way the high-bandwidth binary SLM could be used is in place of the input, representing multi-level inputs through temporal or spatial dithering, or a net configuration designed to use binary-only inputs could be implemented.

An important requirement of drive-side integration is to rapidly transfer in-to and out-of the optical domain with minimal latency. ConvNets represent a high computational load of different primitive operations—coping with this computational bandwidth requires a high-performance system. Furthermore, in order to achieve high system utilisation, a number of jobs must be batched together. This will, however, have effects on latency.

The use of an FPGA-based drive system affords significant power and flexibility. Beyond simply driving the I/O, it can be used to leverage the power of the optical system. Functions such as organising the batch process, filter generation, and determining bipolar convolutions can be implemented in hardware.

Furthermore, the FPGA allows, in certain embodiments, for development of an integrated solution beyond the convolution layer. The non-linear activation function may be implemented in hardware. Furthermore, pooling schemes may also be implemented, either optically, in hardware in the FPGA, or in software.

In a further implementation, an integrated solution may be offered where the drive electronics also implement the other layers of the neural net. This means data can be rapidly digitised and then transferred back into the optical domain between the convolutional layers with minimal latency.

The invention claimed is:

1. An optical processing system for optically processing a convolutional neural network (CNN), the system comprising at least one spatial light modulator (SLM) said spatial light modulator comprising a pixel array, said pixel array being configured to simultaneously display a plurality of input data patterns (a); wherein the plurality of input data patterns (a) comprise a plurality (N) of tiled input data patterns, each of the plurality of tile input data patterns corresponding to a distinct section of said plurality of input data patterns; said system further comprising at least one data focusing pattern which is computed by Fast Fourier Transform (FFT) as a Fourier domain representation (B) of a further input data pattern (b); wherein said further input data pattern (b) comprises a plurality (M) of tiled kernel data patterns, each of the plurality of tiled kernel data patterns corresponding to a distinct section of the further input data pattern (b); said tiled kernel data patterns being processed into positive-valued convolutions; said input data patterns (a) being optically Fourier transformed (OFT) and optically multiplied by said Fourier domain representation (B); and then optically Fourier transformed (OFT) to produce a plurality of optical convolutions; the optical processing system further comprising a detector for detecting light that has been optically processed by said plurality of input data patterns and said data focusing pattern, wherein said plurality of optical convolutions are produced in parallel for each pair (N×M) formed of said tiled input data patterns and said plurality of tiled kernel data patterns during said optical processing; and said system being configured to employ a bias function to determine the sign of said optical convolutions.

2. The optical processing system according to claim 1, wherein said detector and said at least one SLM operate at different speeds; said detector operating at a slower speed than said at least one SLM.

3. The optical processing system according to claim 1, wherein the system has an output which is integrated over a number of different frames.

4. The optical processing system according to claim 1, wherein the neural network is a convolutional neural network (CNN), and wherein the optical convolution is for a convolutional layer of the neural network.

5. The optical processing system according to claim 1, further comprising a processor for digitally obtaining the data focusing pattern from said further input data pattern (b).

6. The optical processing system according to claim 5, wherein the processor is further configured to obtain the data focusing pattern using a minimum Euclidian distance (MED).

7. The optical processing system according to claim 5, wherein said further input data pattern (b) is made up of a number of kernels tiled with appropriate padding, such that the convolution of one input against multiple kernels is implemented in parallel; this input data pattern being converted to a corresponding data focusing pattern (B) for display on the filter SLM.

8. The optical processing system according to claim 1, wherein the data focusing pattern (B) contains spatial frequency components only up to a limited maximum frequency, and said further input data pattern (b) comprises kernels, said limited maximum frequency limiting a width of the kernels corresponding to said further input data pattern (b).

9. The optical processing system according to claim 1, wherein said further input data pattern (b) is a bipolar kernel having positive and negative components, and wherein the optical convolution is a difference between a first convolution of a first data input pattern (a) and a positive representation of the bipolar kernel and a second convolution of a first data input pattern (a) and an applied kernel bias.

10. The optical processing system according to claim 1, wherein said at least one SLM is a binary SLM.

11. The optical processing system according to claim 1, further comprising a lens for controlling magnification and for optically pooling the neural network.

12. The optical processing system according to claim 1, wherein said system comprises an input, a filter, and a camera which operate at different speeds; said camera being slower than both said input and said filter and is used to integrate multiple frames.

13. The optical processing system according to claim 1, wherein said system comprises at least one input SLM, and at least one filter SLM; said input SLM and said filter SLM operating at the same speed; and wherein the speed of said camera is slower than both said SLMs.

14. The optical processing system according to claim 1, wherein said detector has an exposure which spans multiple input SLM frames.

15. The optical processing system according to claim 1, wherein said detector is configured to capture multiple convolutions which are optically integrated.

16. The optical processing system according to claim 1, wherein said optical convolution comprises a number of different layers where inputs are convolved with a given kernel.

17. The optical processing system according to claim 1, wherein said optical processing system is further configured to convolve or pool a layer of the neural network.

18. The optical processing system according to claim 1, wherein said optical processing system is further configured to train or infer a convolutional layer of the neural network.

19. The optical processing system according to claim 1, wherein said optical processing system is for use in deep learning or machine learning for image analysis.

20. A method of configuring a neural network using a 4f optical correlator, the method comprising the steps of:
providing at least one spatial light modulator (SLM), said spatial light modulator comprising a pixel array, said pixel array being configured to display a plurality of input data patterns (a); wherein the plurality of input data patterns (a) comprise a plurality (N) of tiled input data patterns, each of the plurality of tile input data patterns corresponding to a distinct section of said plurality of input data patterns;
determining at least one data focusing pattern (B) as a Fourier domain representation (B) of a further input data pattern (b); wherein said further input data pattern (b) comprises a plurality (M) of tiled kernel data patterns, each of the plurality of tiled kernel data patterns corresponding to a distinct section of the further input data pattern (b); said tiled kernel data patterns being processed into positive-valued convolutions;
displaying on said pixel array, of said at least one SLM, the at least one data focusing pattern (B);
optically Fourier transforming (OFT) said input data patterns (a) and thereafter optically multiplying by said Fourier domain representation (B); and then optically Fourier transforming (OFT) to produce a plurality of optical convolutions; and detecting light that has been optically processed by said input data patterns and said data focusing pattern, wherein said plurality of optical convolutions are produced in parallel for each pair (N×M) formed of said tiled input data patterns and said plurality of tiled kernel data patterns during said optical processing; and employing a bias function to determine the sign of said optical convolutions.

21. The method according to claim 20, wherein the method comprises the further step of providing at least one SLM for displaying patterns and a detector; and operating said at least one SLM and said detector at different speeds; said detector operating at a slower speed than said at least one SLM.

22. The method according to claim 21, further comprising the step of integrating an output over a number of different frames.

23. The method according to claim 20, further comprising the steps of tiling said plurality of input data patterns and producing a plurality of optical convolutions in parallel.

* * * * *